(12) United States Patent
Yin et al.

(10) Patent No.: US 11,504,216 B2
(45) Date of Patent: Nov. 22, 2022

(54) WATER FLOSSER

(71) Applicant: Xiamen Solex High-Tech Industries Co., Ltd., Xiamen (CN)

(72) Inventors: Zhaojin Yin, Xiamen (CN); Guihua Yan, Xiamen (CN); Mingfu Zhang, Xiamen (CN); Ben Li, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 103 days.

(21) Appl. No.: 17/107,925

(22) Filed: Nov. 30, 2020

(65) Prior Publication Data

US 2021/0077235 A1    Mar. 18, 2021

Related U.S. Application Data

(63) Continuation of application No. PCT/CN2018/096631, filed on Jul. 23, 2018.

(30) Foreign Application Priority Data

May 31, 2018 (CN) .......................... 201810552896.2
May 31, 2018 (CN) .......................... 201820838678.0

(51) Int. Cl.
*A61C 17/02* (2006.01)
*A61C 17/024* (2006.01)
*A61H 13/00* (2006.01)

(52) U.S. Cl.
CPC ........ *A61C 17/0202* (2013.01); *A61C 17/024* (2019.05); *A61H 13/005* (2013.01); *A61C 17/02* (2013.01)

(58) Field of Classification Search
CPC .... A61H 9/0007; A61H 13/00; A61H 9/0021; A61H 9/0028; A61H 9/0071; A61H 9/00; A61C 17/00; A61C 17/032; A61C 17/028; A61C 17/024; A61C 17/0205; A61C 17/02; B05B 12/00–088; B08B 3/00–04
USPC ........................................................ 601/162
See application file for complete search history.

(56) References Cited

U.S. PATENT DOCUMENTS 4,236,889 A * 12/1980 Wright .................. A61C 17/02
601/162
2016/0228226 A1    8/2016 Choi

FOREIGN PATENT DOCUMENTS

| CN | 2149184 Y | 12/1993 |
|---|---|---|
| CN | 2761162 Y | 3/2006 |
| CN | 202335936 U | 7/2012 |
| CN | 202982289 U | 6/2013 |
| CN | 204671301 U | 9/2015 |

(Continued)

OTHER PUBLICATIONS

International Search Repon with English Translation, cited in PCT/CN2018/096631 dated Mar. 11, 2019, 8 pages.

(Continued)

*Primary Examiner* — Cris L. Rodriguez
*Assistant Examiner* — Sydney J Pulvidente
(74) *Attorney, Agent, or Firm* — Cooper Legal Group LLC

(57) ABSTRACT

The present disclosure discloses a water flosser comprises a housing, a tooth irrigation portion, a water nozzle portion, a winding mechanism, and a water pipe configured to be bent and wound. The tooth irrigation portion is disposed in the housing and comprises a water inlet and a water outlet. The water nozzle portion is in communication with the water outlet of the tooth irrigation portion.

23 Claims, 14 Drawing Sheets

(56) References Cited

FOREIGN PATENT DOCUMENTS

| | | | |
|---|---|---|---|
| CN | 107088103 A | | 8/2017 |
| CN | 206822727 U | | 1/2018 |
| CN | 110547889 A | | 12/2019 |
| KR | 20080107725 A | * | 11/2008 |
| KR | 20080107725 A | | 12/2008 |

OTHER PUBLICATIONS

Written Opinion cited in PCT/CN2018/096631 dated Mar. 11, 2019, 3 pages.

* cited by examiner

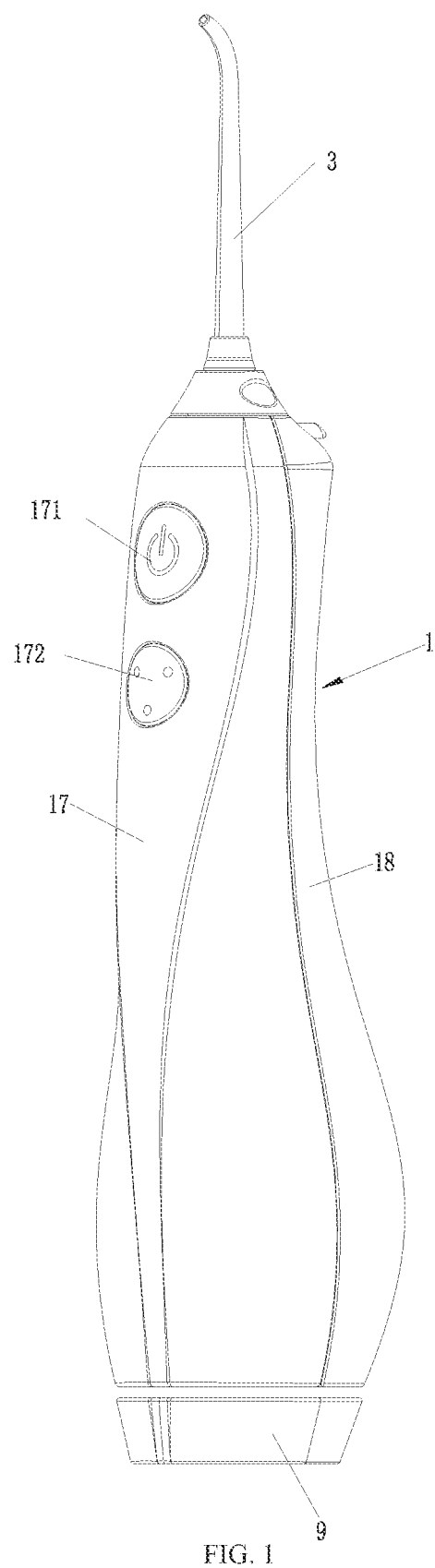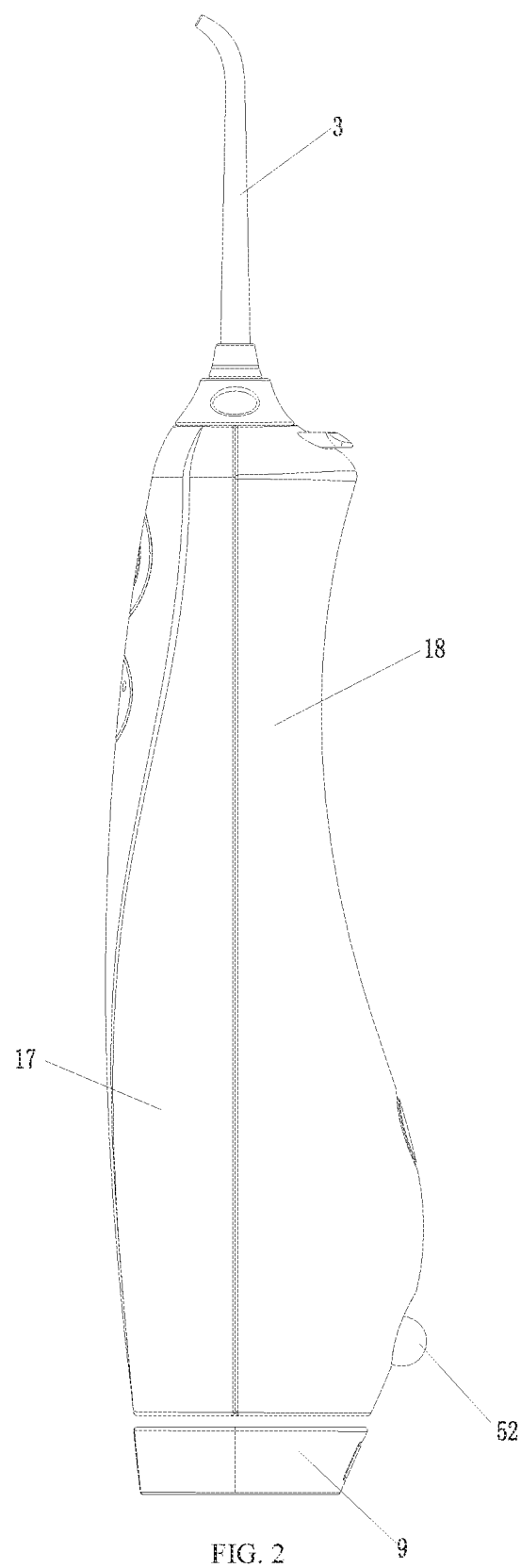
FIG. 1
FIG. 2

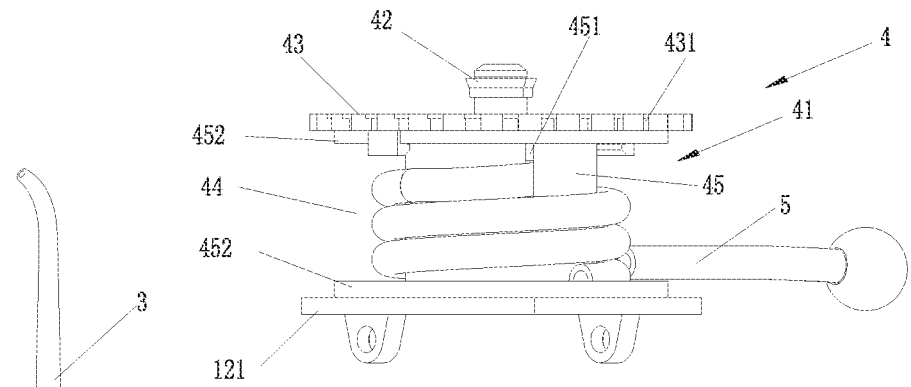
FIG. 7
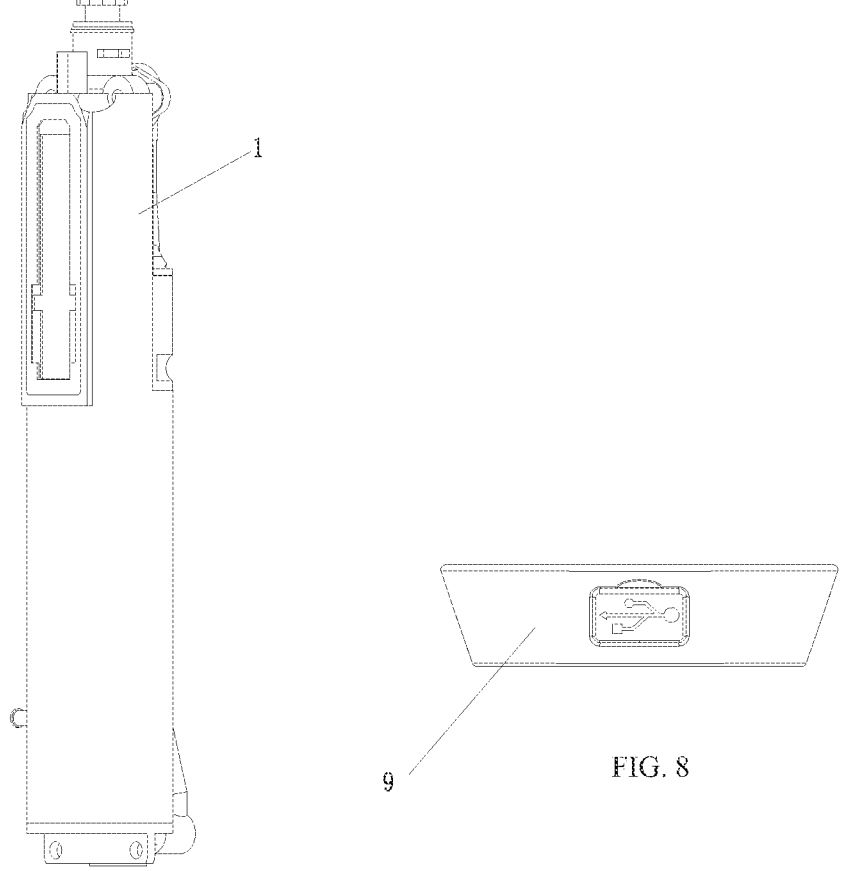
FIG. 8
FIG. 6

WATER FLOSSER

RELATED APPLICATIONS

This application is a continuation of and claims priority to International Patent Application PCT/CN2018/096631, filed on Jul. 23, 2018, which claims priority to Chinese patent application number 201820838678.0, filed on May 31, 2018, and Chinese patent application 201810552896.2, filed on May 31, 2018. International Patent Application PCT/CN2018/096631, Chinese patent application number 201820838678.0, and Chinese patent application 201810552896.2 are incorporated herein by reference.

FIELD OF THE DISCLOSURE

The present disclosure relates to tooth cleaning, and in particular relates to a tooth irrigator.

BACKGROUND OF THE DISCLOSURE

Existing water flossers comprise a housing, a tooth irrigation portion, a water nozzle portion, and a water tank. The tooth irrigation portion is disposed in the housing and comprises a water inlet and a water outlet, and the water nozzle portion is attached to the housing. The water tank is disposed in the housing. The water outlet of the tooth irrigation portion is connected to the water nozzle portion, and the water inlet of the tooth irrigation portion is connected to the water tank, so that the tooth irrigation portion can obtain water in the water tank and jet the water through the water nozzle portion. The water tank occupies a large space and has a large volume, which results in the water flossers being not suitable for carrying, storage, packaging, and transportation. Some people have proposed solutions to the above shortcomings, such as described in Chinese Patent Application CN206822727U, which omits the water tank and adds a water pipe. The water pipe adopts a telescopic pipe. When in use, a first end of the telescopic pipe is connected to the water inlet of the tooth irrigation portion, and a second end of the telescopic pipe is inserted into a water cup to acquire water in the water cup. Although the proposed solution solves the abovementioned problems, the proposed solution still has the following shortcomings: 1. the telescopic pipe is easy to lose; 2. the telescopic pipe is separable from a remainder of the water flosser, the telescopic pipe is not portable, and the packaging is inconvenient; 3. the steps for using the water flosser are complicated and inconvenient; and 4. when in use, one end of the telescopic pipe is connected to the water inlet of the tooth irrigation portion and the other end is connected to the water cup, so usable space is limited.

BRIEF SUMMARY OF THE DISCLOSURE

In order to solve the technical problems, the present disclosure provides a water flosser to solve the deficiencies in the background.

A technical solution of the present disclosure is as follows.

A water flosser comprises a housing, a tooth irrigation portion, a water nozzle portion, a winding mechanism, and a water pipe configured to be bent and wound. The tooth irrigation portion is disposed in the housing and comprises a water inlet and a water outlet. The water nozzle portion is in communication with the water outlet of the tooth irrigation portion, and the winding mechanism is connected to the housing and comprises a rotating portion configured to rotate relative to the housing. A first end of the water pipe is relatively fixed on the rotating portion. The first end of the water pipe is configured to be in communication with the water inlet of the tooth irrigation portion. The water pipe is wound on the rotating portion, and a second end of the water pipe is configured to extend out of the winding mechanism.

In an embodiment, the winding mechanism is disposed in the housing. An accommodating space configured to receive the water pipe is disposed between the housing and the winding mechanism, and the second end of the water pipe is configured to extend out of the housing.

In an embodiment, the water flosser further comprises a water connector. The water connector is rotatably connected to and is in communication with the water inlet of the tooth irrigation portion. The first end of the water pipe is fixedly connected to and is in communication with the water connector.

In an embodiment, the rotating portion comprises a water outlet cover, and the water outlet cover is fixedly connected to the water connector.

In an embodiment, an outer revolving surface of the rotating portion is concave to define an annular accommodating groove, and the water pipe is wound in the annular accommodating groove.

In an embodiment, the water flosser further comprises a fixed portion. The rotating portion comprises a rotating drum, and an inner side of the rotating drum is fixedly connected to a partition plate. The rotating portion is relatively rotatably connected to the fixed portion, and a receiving space is defined between the partition plate disposed in the rotating drum and the fixed portion.

In an embodiment, the fixed portion comprises a fixed plate and a fixed shaft fixed on the fixed plate. The fixed shaft passes through an upper side of the partition plate and is further disposed with a blocking ring connected to the fixed shaft, and the blocking ring abuts the upper side of the partition plate.

In an embodiment, the rotating portion comprises a rotating drum, and the water pipe is wound around the rotating drum. The rotating drum comprises an opening penetrating an inner side and an outer side of a wall of the rotating drum, and the first end of the water pipe extends into the rotating drum through the opening. The first end of the water pipe is relatively fixed with the rotating drum.

In an embodiment, the water flosser further comprises an elastic member. The elastic member cooperates with the rotating portion and the housing to generate a reset torque when the rotating portion rotates forward, and the reset torque is configured to drive the rotating portion to rotate in reverse to achieve retraction of the water pipe.

In an embodiment, the water flosser further comprises an elastic member. The elastic member is disposed in the receiving space and is connected to the rotating portion and the fixed portion to generate a reset torque when the rotating portion rotates forward, and the reset torque is configured to drive the rotating portion to rotate in reverse to achieve retraction of the water pipe.

In an embodiment, the water flosser further comprises a rotation stop mechanism. The rotation stop mechanism cooperates with the rotating portion to stop the rotating portion from rotating.

In an embodiment, the water flosser further comprises a rotation stop mechanism. The fixed portion comprises a fixed plate, and the rotation stop mechanism comprises a sliding groove extending inward from a top surface of the fixed plate and a movable ball. The movable ball is connected to the sliding groove and is configured to move along the sliding groove. The movable ball at least partly extends out of a slot opening of the sliding groove, and a lower end of the rotating drum is fixed with a track plate. A bottom surface of the track plate is concave to define a matching groove configured to cooperate with the movable ball, and the matching groove comprises an inner annular track, an outer annular track, and a rotation stop position. The rotation stop position is disposed between the inner annular track and the outer annular track, and a first communication groove is disposed between the rotation stop position and the outer annular track. A second communication groove is disposed between the rotation stop position and the inner annular track, and a third communication groove is disposed between the inner annular track and the outer annular track.

In an embodiment, the sliding groove is radially disposed relative to an axis line of the rotating portion.

In an embodiment, the inner annular track comprises an inner annular circular groove around an axis line of the rotating drum, and the third communication groove is linearly disposed along a direction of a tangent line of the inner annular circular groove.

In an embodiment, a rotation direction from the outer annular track to the rotation stop position is reverse to a rotation direction from the rotation stop position to the inner annular track.

In an embodiment, the outer annular track comprises an outer arc groove disposed around an axis line of the rotating drum and a fourth communication groove in communication with two ends of the outer arc groove. The first communication groove is in communication with a first end of the outer arc groove, and the third communication groove is in communication with the outer arc groove. A connection between the fourth communication groove and the first end of the outer arc groove defines an inflection point.

In an embodiment, a depth from the first end of the outer arc groove to a tail end of the fourth communication groove increases, and a depth from the outer annular track to the third communication groove increases. A depth of the first communication groove is shallower than a depth of the second communication groove, and the depth of the second communication groove is shallower than a depth of the inner annular circular groove.

In an embodiment, the rotating portion comprises a circular portion, and the circular portion is disposed with gear teeth. The rotation stop mechanism comprises the gear teeth and a control member movably connected to the housing. The control member is configured to move between a rotation stop position and a stop release position. The control member, when at the rotation stop position, is locked between two adjacent gear teeth to restrict a rotation of the rotating portion, and the control member, when at the release position, is separated from the circular portion.

In an embodiment, the control member is swingably connected to the housing, and the housing is disposed with an operating member. The operating member is operatively connected to the control member to drive the control member to swing.

In an embodiment, a second end of the control member is disposed with a rotation stop piece. The rotation stop piece of the control member, when at the rotation stop position, is locked between two adjacent gear teeth, and the operating member is operatively connected to a first end of the control member.

In an embodiment, the rotation stop mechanism further comprises an elastic body. The elastic body is connected to the housing and the control member to enable the control member to be subjected to an elastic force or a torque when the control member is moved from the stop release position to the rotation stop position.

In an embodiment, the water flosser further comprises a motor. The motor is operatively connected to the rotating portion to drive the rotating portion to rotate forward and reverse.

In an embodiment, the water flosser further comprises a motor. The motor is disposed in the accommodating space, and a power output shaft of the motor cooperates with the partition plate to drive the rotating portion to rotate forward and reverse through the motor.

In an embodiment, the water flosser further comprises a wireless charging portion. The wireless charging portion mutually cooperates with the housing.

Compared with the existing techniques, the technical solution has the following advantages.

The device further comprises a winding mechanism and a water pipe that can be bent and wound. The winding mechanism is connected to the housing and comprises a rotating portion that can rotate relative to the housing. The first end of the water pipe and the rotating portion are relatively fixed, and the first end of the water pipe can be connected to the inlet of the tooth irrigation portion. The water pipe is wound on the rotating portion, and the second end can extend out of the winding mechanism. Since the water pipe can be wound through the winding mechanism, the space occupied by the water pipe is reduced, and the water flosser is convenient to carry, package, and transport. The loss of the water pipe can also be avoided. Moreover, since the water pipe can be bent and wound, it is convenient to place the second end of the water pipe in a container with water or to connect the water pipe to a water source. Therefore, the water flosser can be widely used, and the water pipe can be neatly wound.

The winding mechanism is installed in the housing, and there is a space for placing the water pipe between the housing and the winding mechanism. The water pipe is housed in the housing, which makes for a beautiful appearance, reduces the space occupied by the water pipe, and is convenient for carrying, packaging and transporting. Moreover, the loss of the water pipe can be avoided.

The water flosser further comprises a rotation stop mechanism that cooperates with the rotating portion to control the rotating portion to rotate or stop rotating, so the water pipe can be controlled to be maintained at any position.

The water flosser further comprises a wireless charging portion, which mates with the housing and can charge the water flosser.

BRIEF DESCRIPTION OF THE DRAWINGS

FIG. 1 illustrates a first structural view of a water flosser of Embodiment 1.

FIG. 2 illustrates a second structural view of the water flosser of Embodiment 1 when a water pipe is in a retracted state.

FIG. 6 illustrates a structural view of an assembly of a tooth irrigation portion and a water nozzle portion of the water flosser of Embodiment 1.

FIG. 7 illustrates a structural view of an assembly of a winding mechanism and a water pipe of Embodiment 1.

FIG. 8 illustrates a structural view of a wireless charging portion of Embodiment 1.

DETAILED DESCRIPTION OF THE EMBODIMENTS

Figure 3:
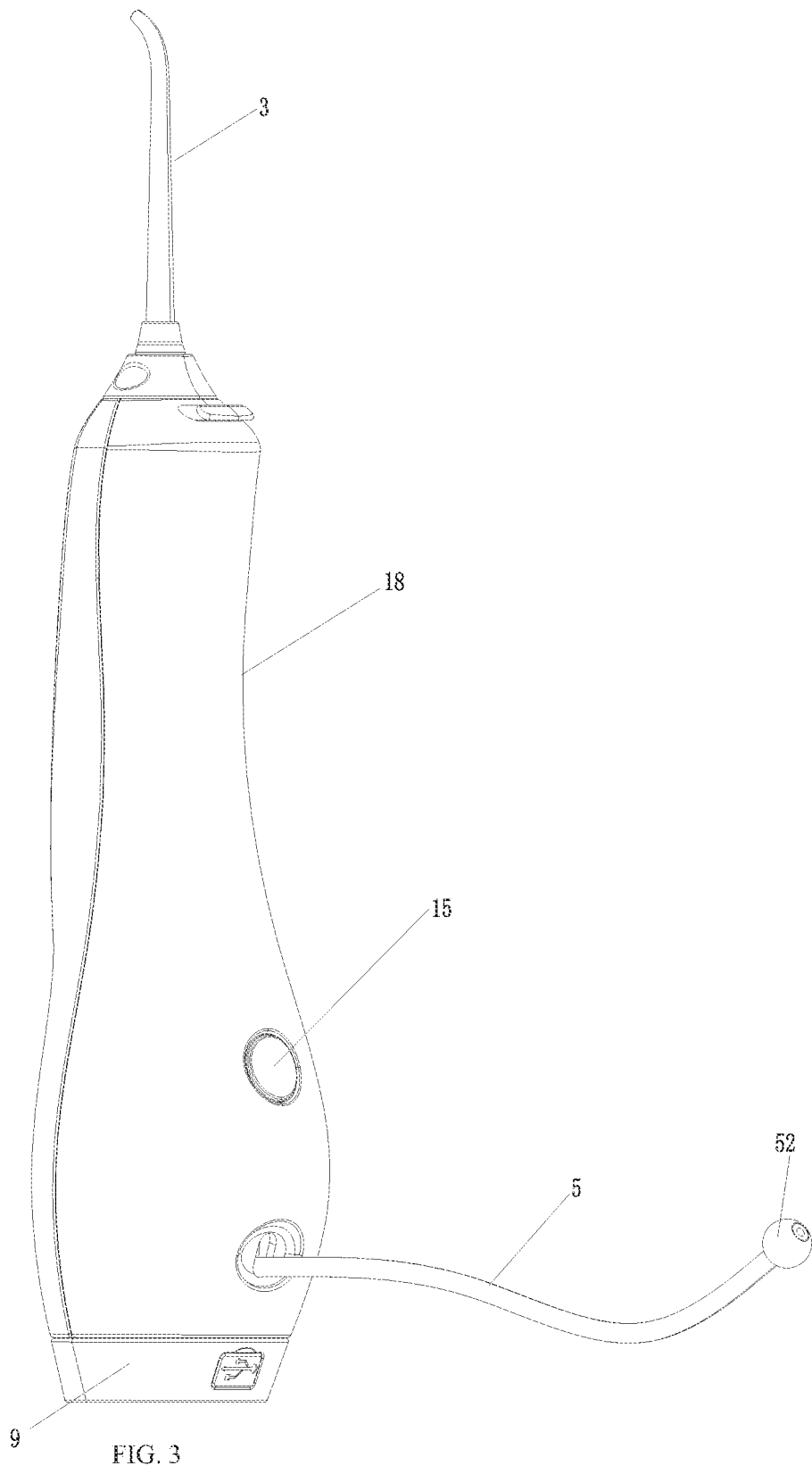
FIG. 3 illustrates a third structural view of the water flosser of Embodiment 1 when the water pipe is in an extended state.
Figure 4:
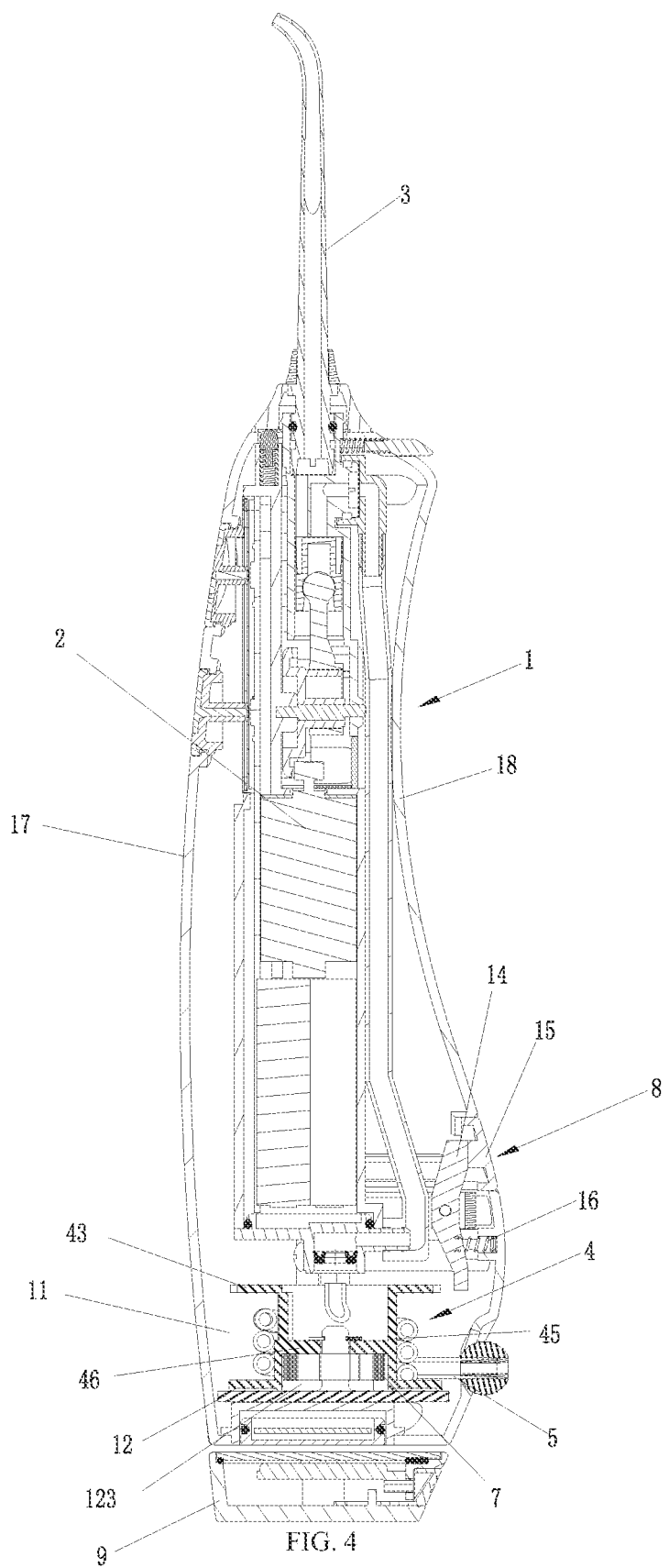
FIG. 4 illustrates a cross-sectional structural view of the water flosser of Embodiment 1.
Figure 5:
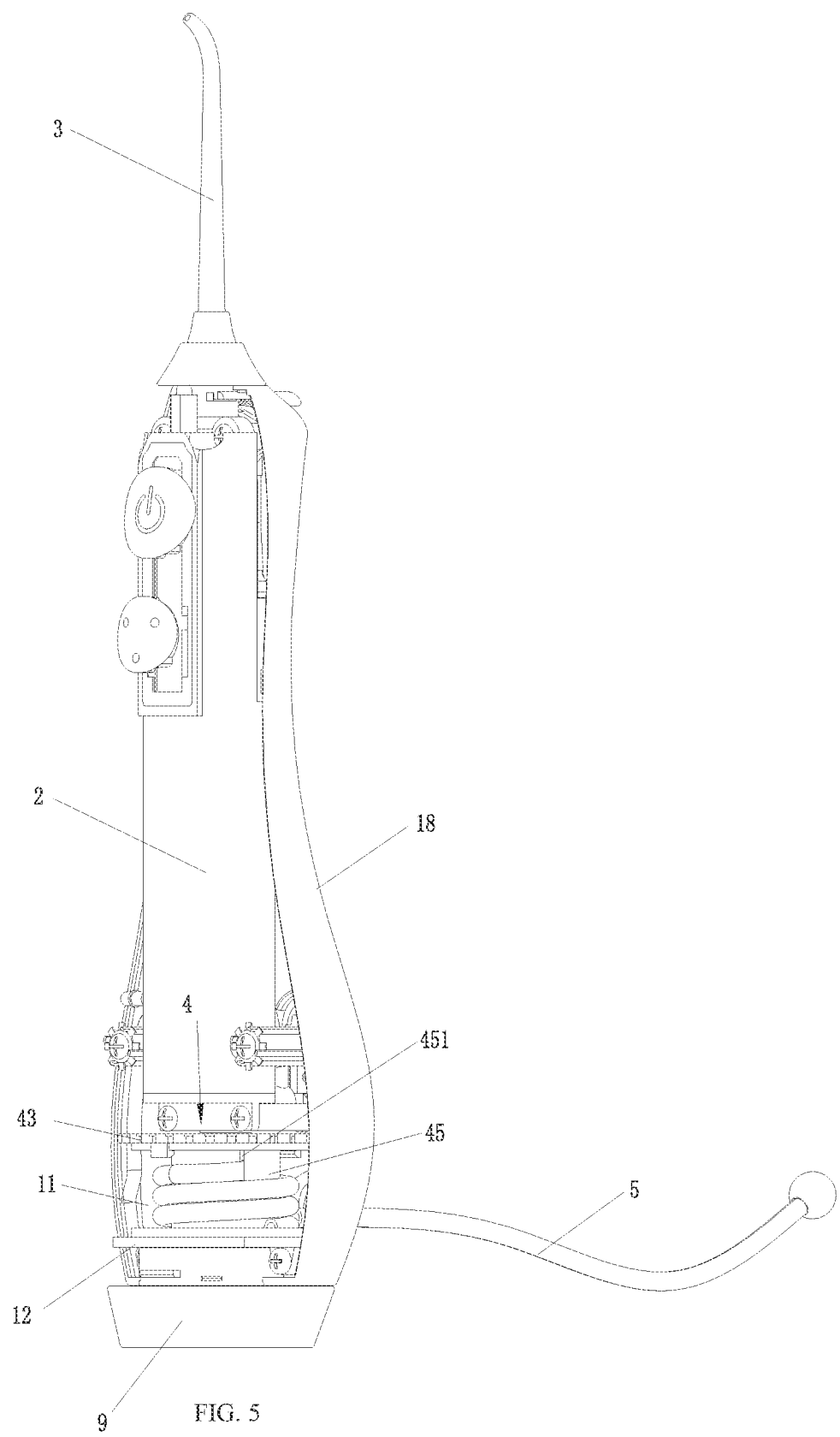
FIG. 5 illustrates a perspective view of the water flosser of Embodiment 1 when a front housing of the water flosser is removed.
Figure 9:
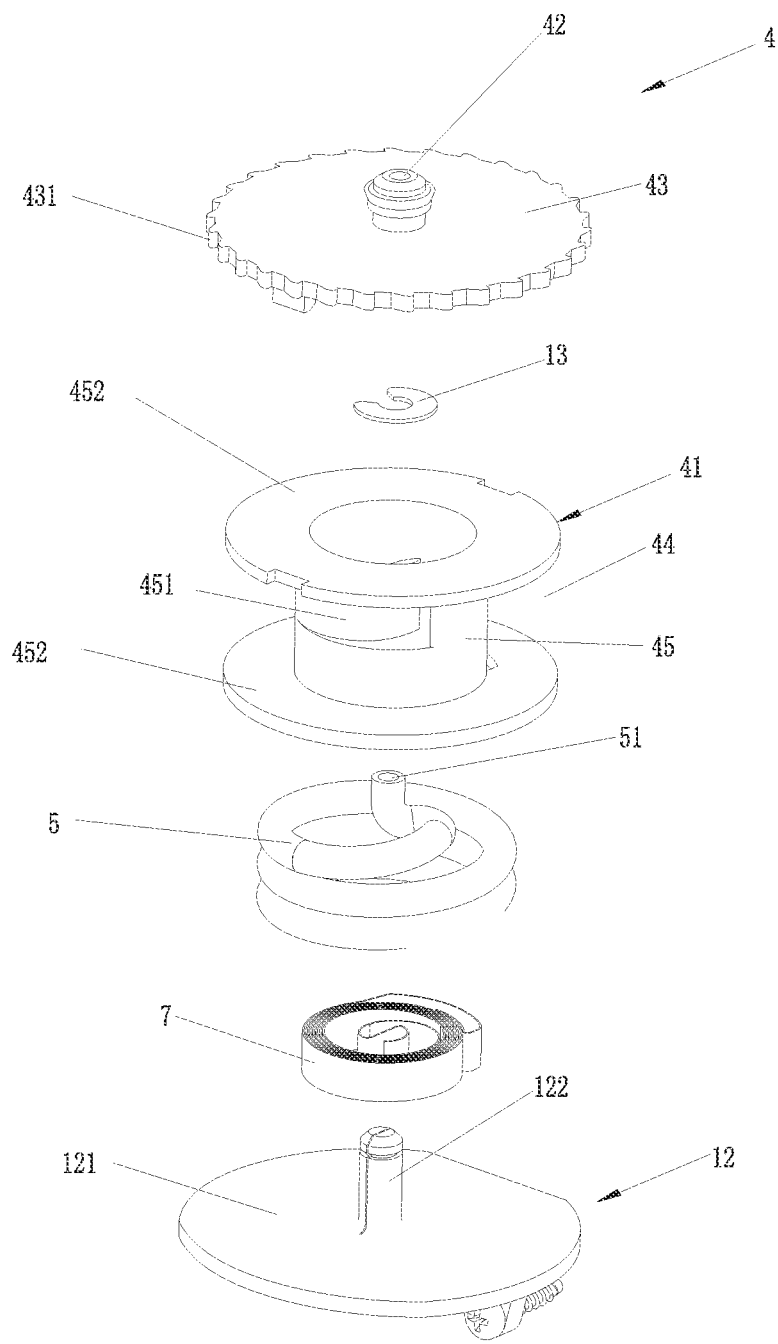
FIG. 9 illustrates an exploded structural view of the winding mechanism and the water pipe of Embodiment 1.
Figure 10:
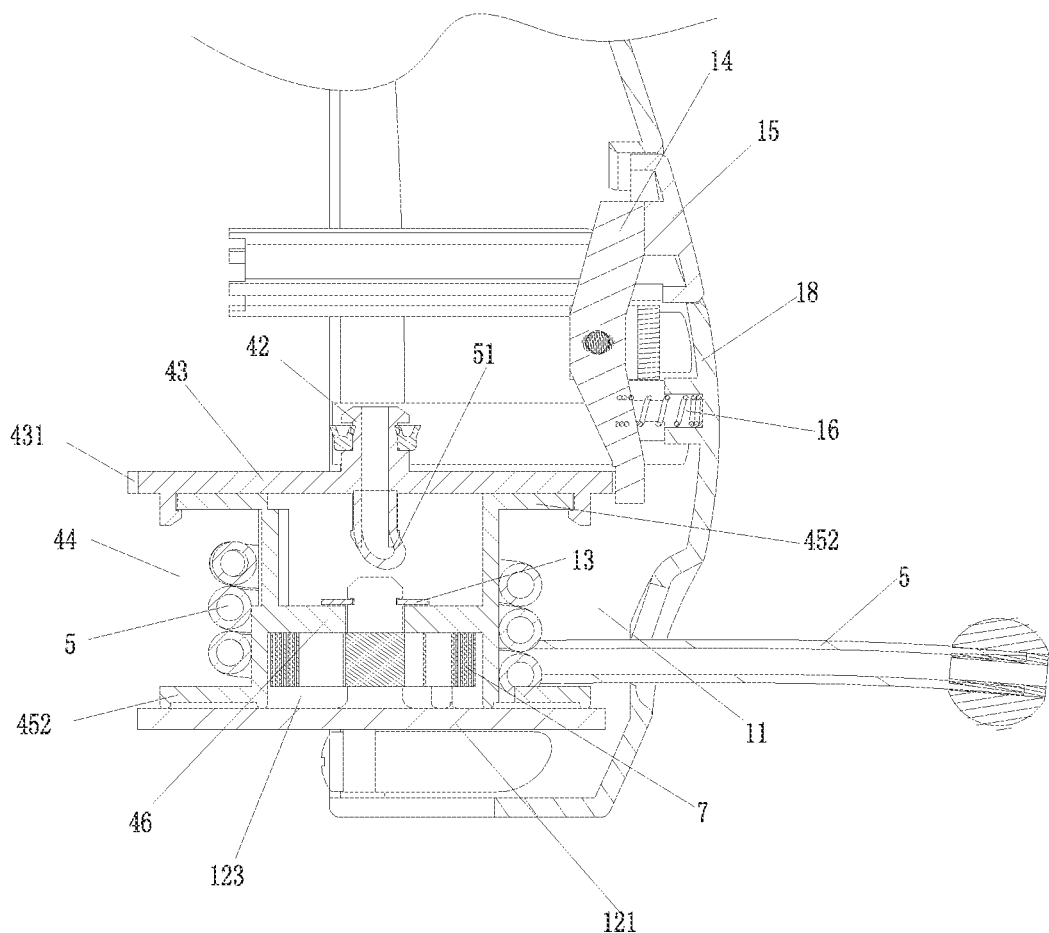
FIG. 10 illustrates a cross-sectional view of the assembly of the winding mechanism and the water pipe of Embodiment 1.
Figure 11:
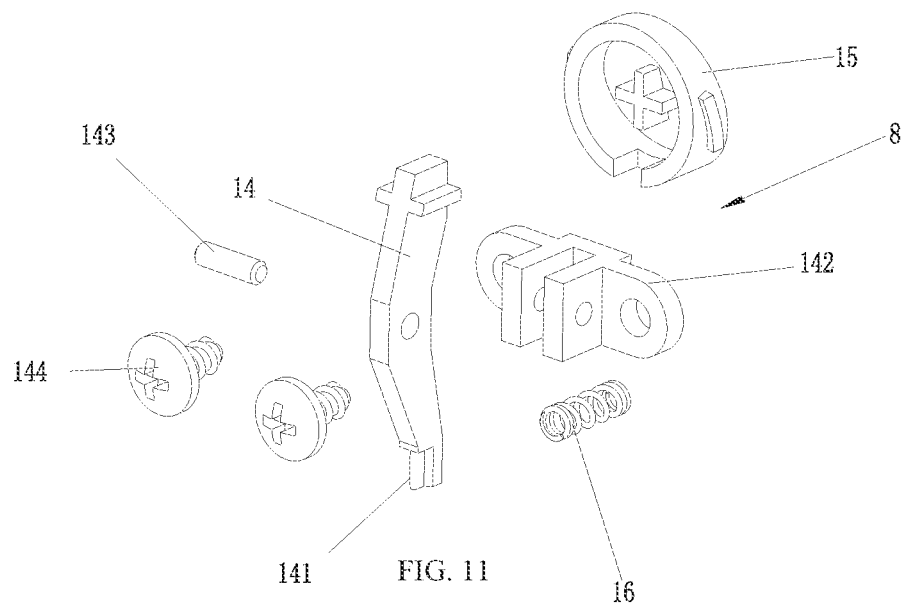
FIG. 11 illustrates an exploded structural view of an operating member, a control member, and an elastic body of Embodiment 1.
Figure 12:
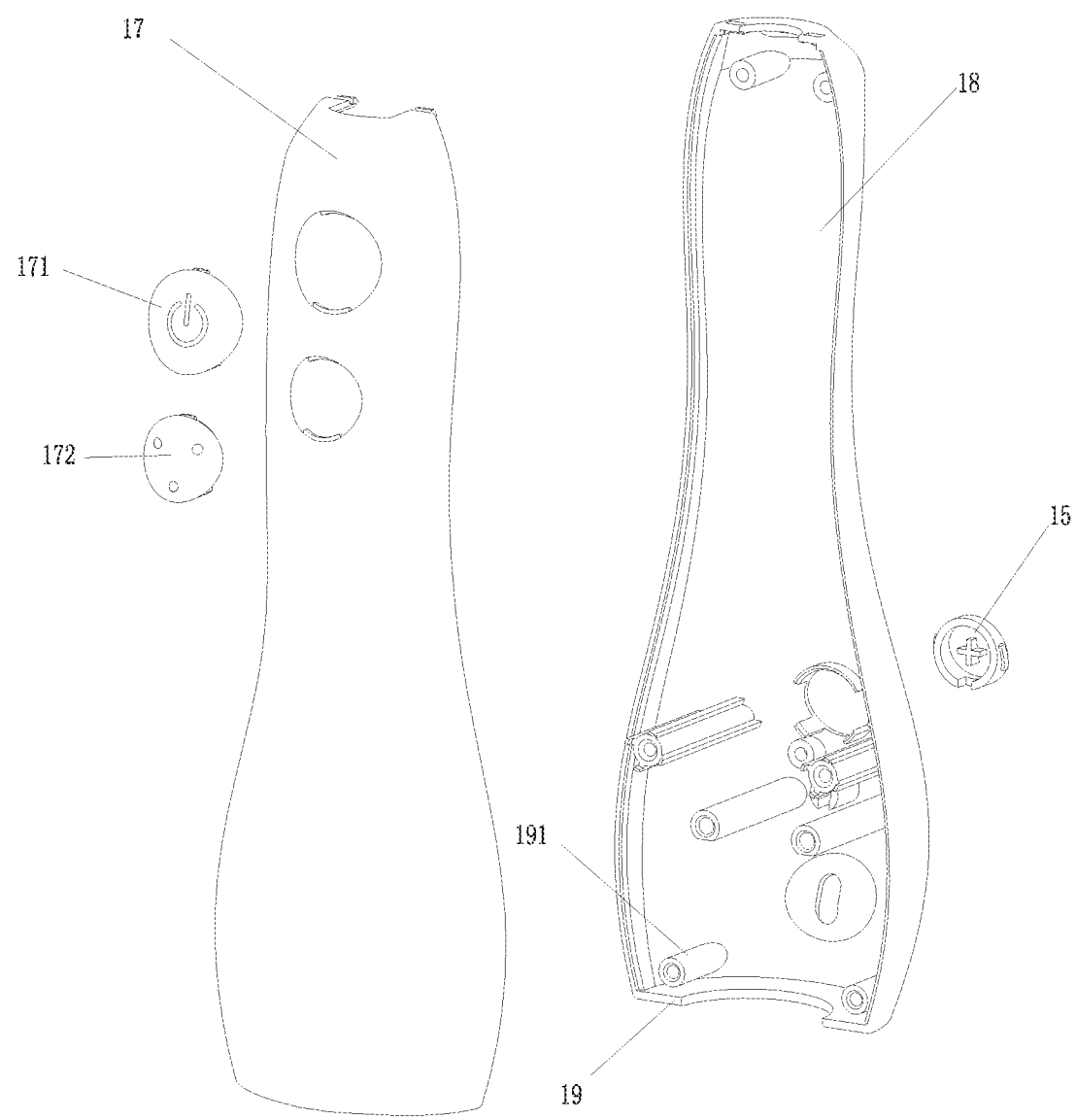
FIG. 12 illustrates an exploded perspective view of a housing of Embodiment 1.

The present disclosure will be further described below in combination with the accompanying drawings and embodiments.

Embodiment 1

Referring to FIGS. 1-13, a water flosser comprises a housing 1, a tooth irrigation portion 2, a water nozzle portion 3, a winding mechanism 4, and a water pipe 5 configured to be bent and wound. The tooth irrigation portion 2 is fixedly disposed in the housing 1 and comprises a water inlet and a water outlet. The water nozzle portion 3 is fixedly disposed on the housing 1 and is in communication with the water outlet of the tooth irrigation portion 2. The tooth irrigation portion 2 and the water nozzle portion 3 are conventional and will not be further described here. As needed, the water nozzle portion 3 and the housing 1 are configured to define a detachable connection structure. Moreover, after assembly, the water nozzle portion 3 is configured to rotate relative to the housing 1 in 360°. As needed, the water flosser can be adjusted in three gearing positions comprising a high frequency gearing position, an intermediate frequency gearing position, and a low frequency gearing position. The water pipe 5 is, for example, a water pipe made of a flexible material or a corrugated pipe.

Figure 13:
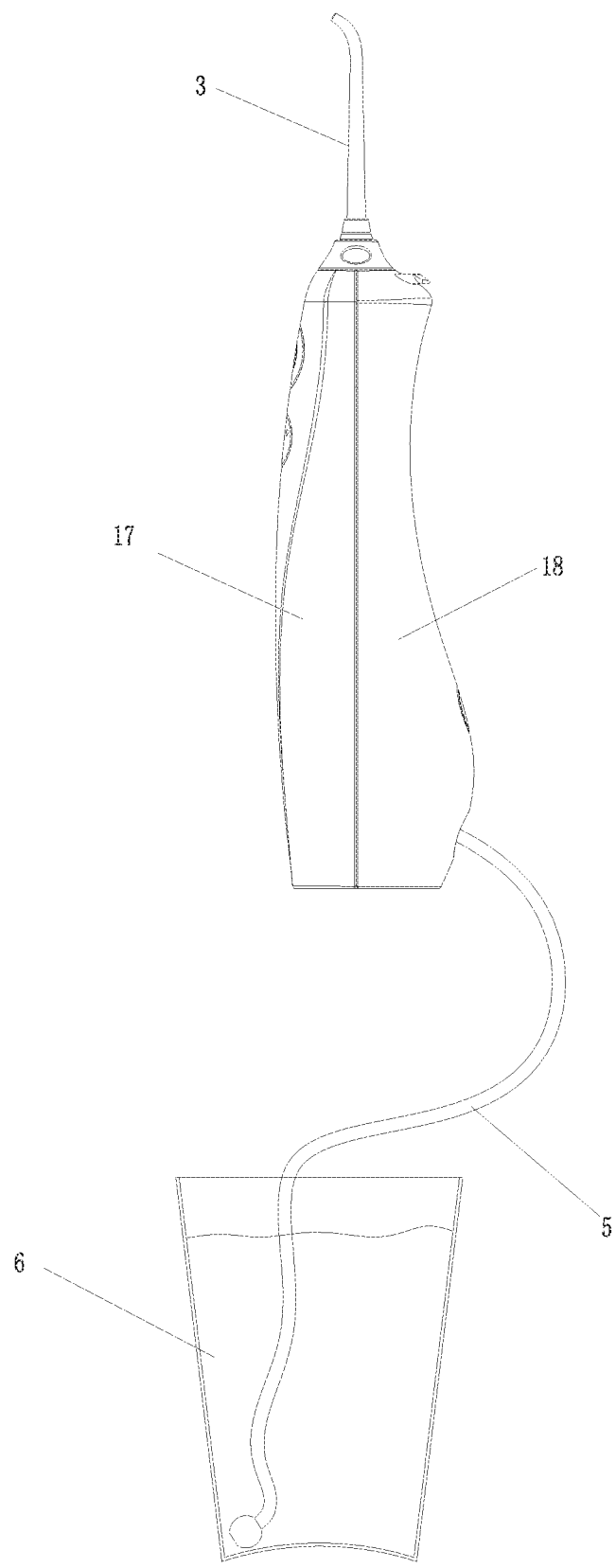
FIG. 13 illustrates an in-use view of the water flosser of Embodiment 1.
Figure 14:
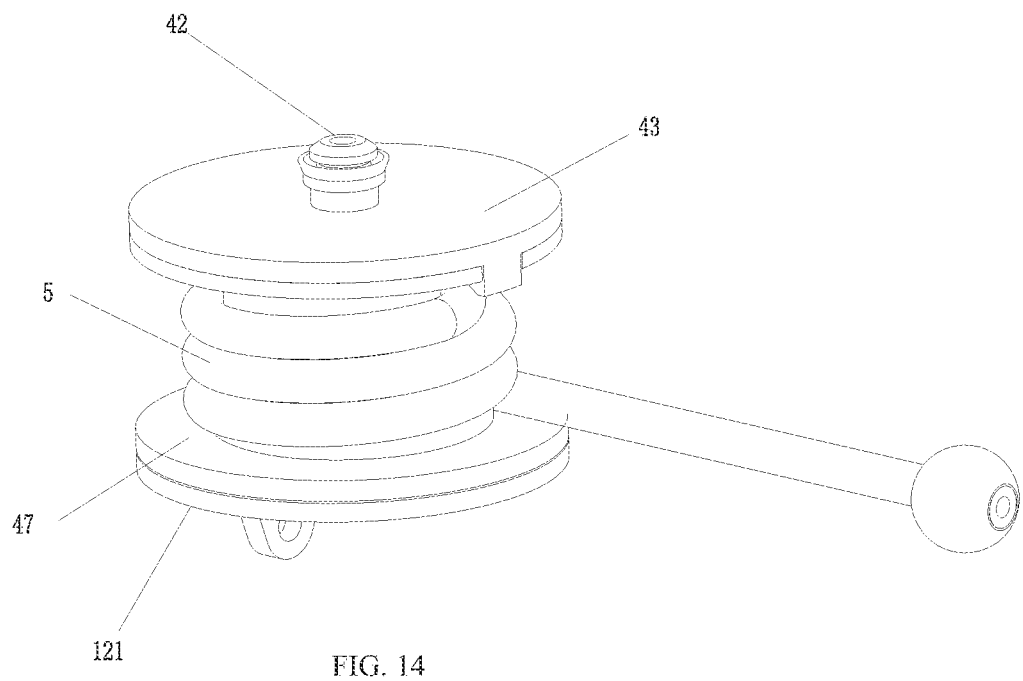
FIG. 14 illustrates a structural view of an assembly of a winding mechanism and a water pipe of Embodiment 2.
Figure 15:
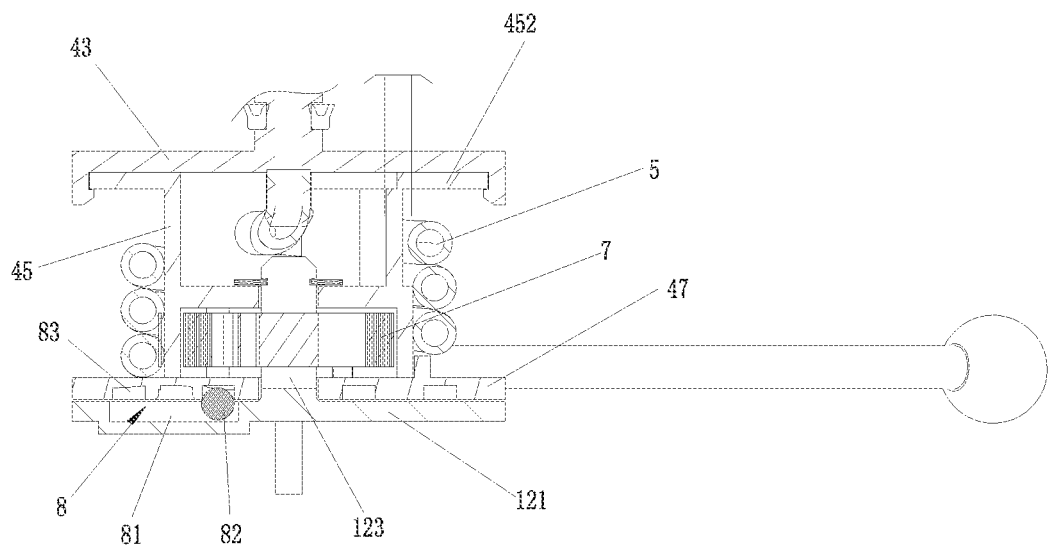
FIG. 15 illustrates a cross-sectional view of the assembly of the winding mechanism and the water pipe of Embodiment 2.
Figure 16:
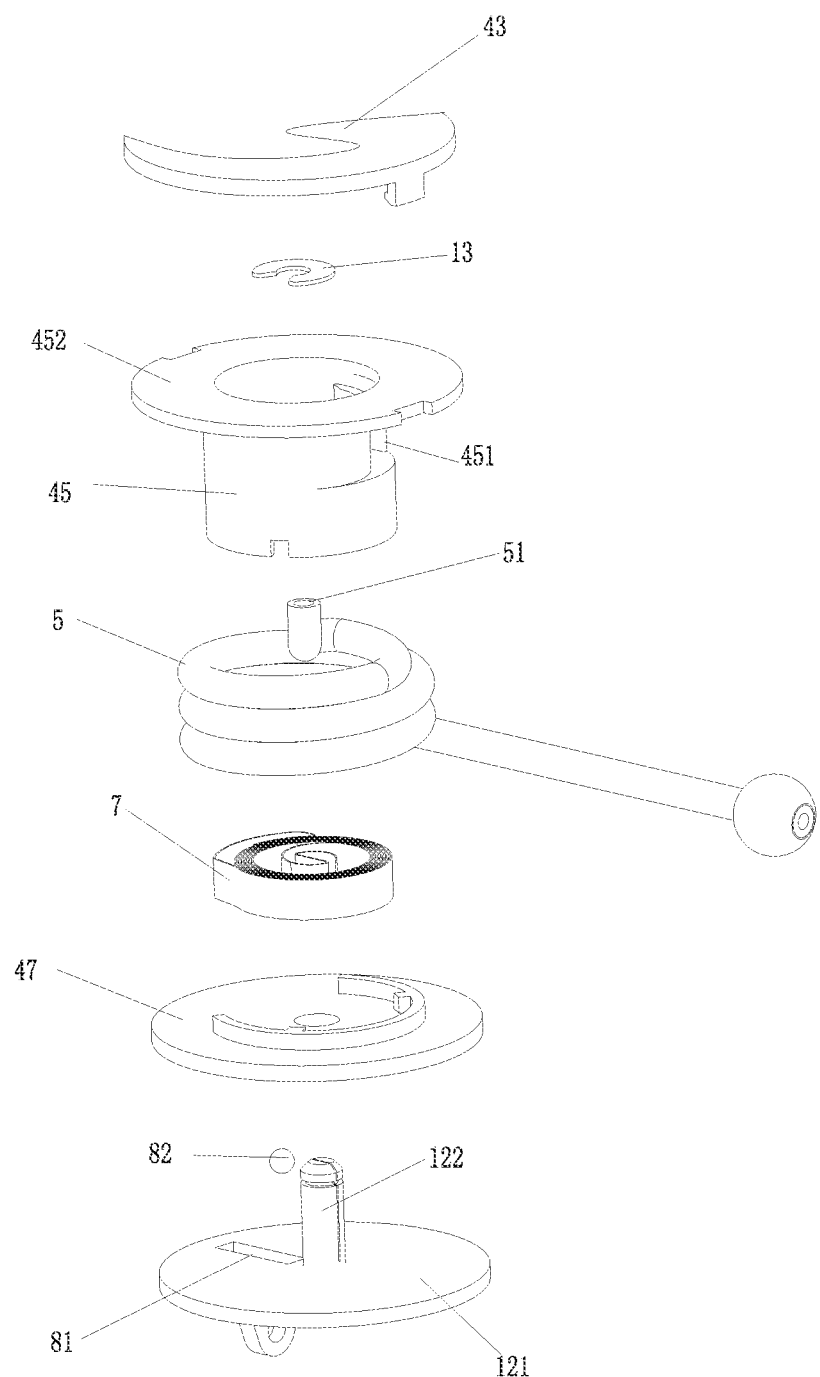
FIG. 16 illustrates an exploded structural view of the winding mechanism and the water pipe of Embodiment 2.
Figure 17:
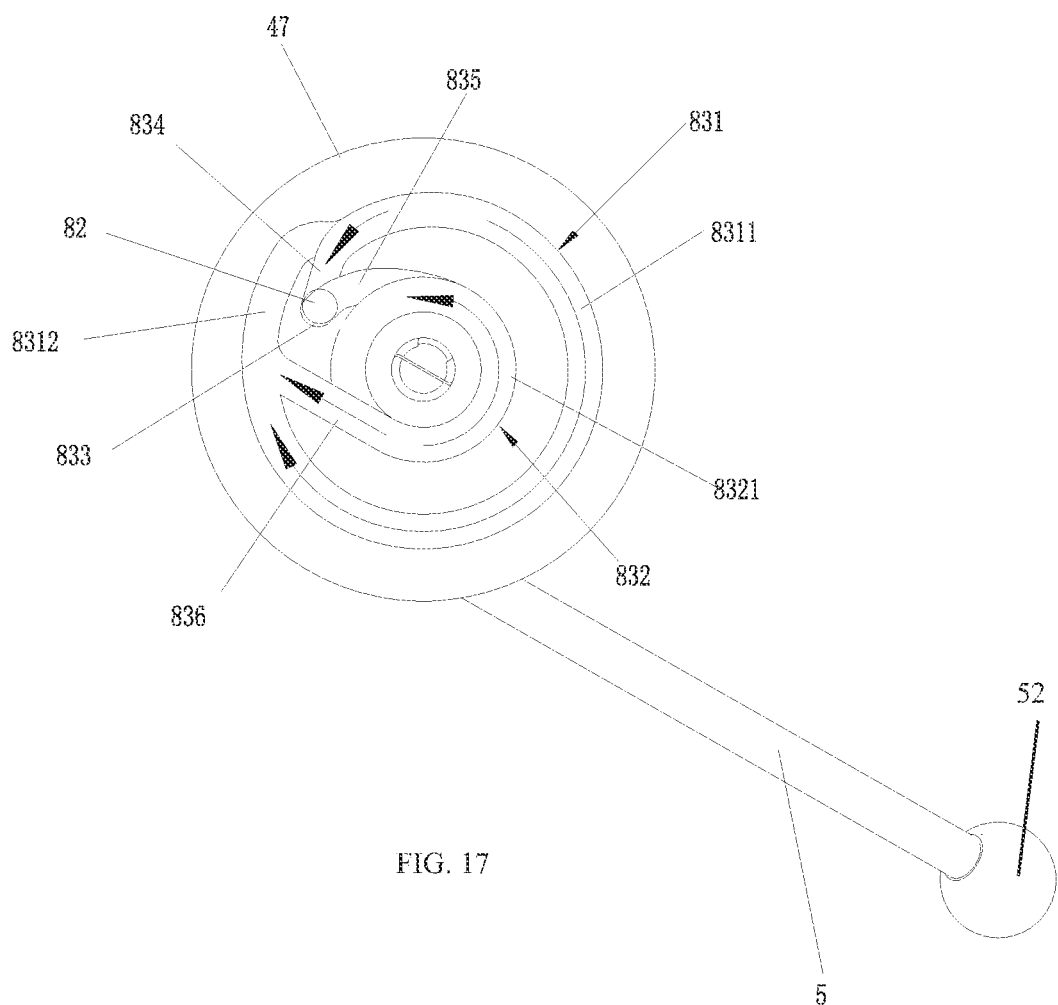
FIG. 17 illustrates a bottom view of the assembly of the winding mechanism and the water pipe of Embodiment 2.
Figure 18:
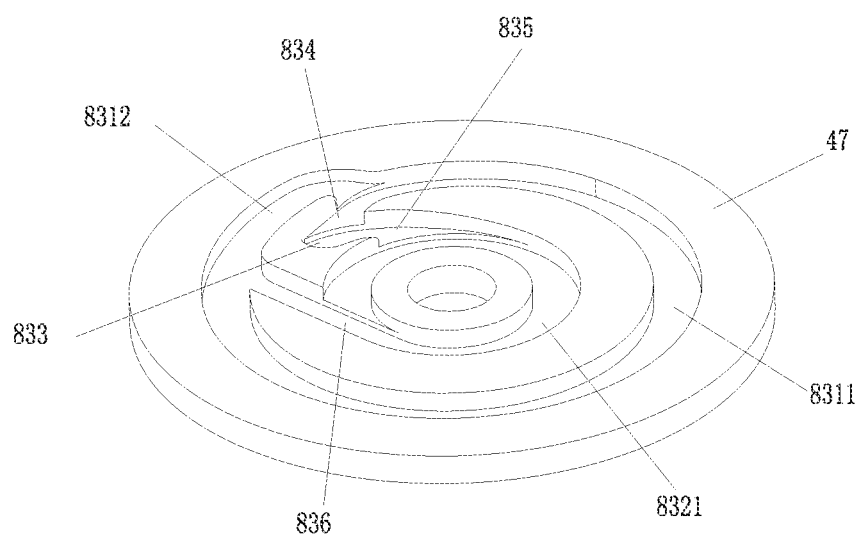
FIG. 18 illustrates a perspective view of a track plate of Embodiment 2.

The winding mechanism 4 is disposed in the housing 1, and an accommodating space 11 configured to receive the water pipe 5 is disposed between the housing 1 and the winding mechanism 4. The winding mechanism 4 comprises a rotating portion 41 configured to rotate relative to the housing 1. A first end 51 of the water pipe 5 is relatively fixed on the rotating portion 41, and the first end 51 of the water pipe 5 is configured to be in communication with the water inlet of the tooth irrigation portion 2. The water pipe 5 is wound on the rotating portion 41, and a second end of the water pipe 5 is configured to extend out of the winding mechanism 4 and extend out of the housing 1. The water pipe 5 can be extended or retracted due to a forward rotation or a reverse rotation of the rotating portion 41 of the winding mechanism 4. In this way, the water pipe 5 can be stored in the accommodating space 11 when the water pipe 5 is retract. The water flosser, with the water pipe 5 being retracted, occupies a small space and is convenient for carrying, packaging, and transport and can also prevent the loss of the water pipe 5. Moreover, the use of a bendable water pipe makes it convenient to place the second end of the water pipe 5 in a container 6 filled with water (as shown in FIG. 13) or to connect the second end of the water pipe 5 to a water source.

In order to improve a seal performance of a communication between the first end 51 of the water pipe 5 and the water inlet of the tooth irrigation portion 2 and to prolong a service life of a seal, the water flosser further comprise a water connector 42, the water connector 42 rotatably cooperates with and is in communication with the water inlet of the tooth irrigation portion 2. The first end 51 of the water pipe 5 is fixedly connected to and is in communication with the water connector 42, so that the first end 51 of the water pipe 5 is in communication with the water inlet of the tooth irrigation portion 2 through the water connector 42.

In some embodiments, the rotating portion 41 comprises a water outlet cover 43, and the water connector 42 is fixed on a center of the water outlet cover 43 to position the water connector 42 so as to facilitate the water connector 42 being connected to the first end 51 of the water pipe 5 and to facilitate the water connector 42 being connected to the water inlet of the tooth irrigation portion 2.

In order to facilitate positioning of the water pipe 5 and improve guidance for a winding of the winding mechanism 4, in some embodiments, an outer revolving surface of the rotating portion 41 is concave to define an annular accommodation groove 44, and the water pipe 5 is wound in the annular accommodation groove 44. The annular accommodating groove 44 defines the accommodating space 11 or a portion of the accommodating space 11. In this embodiment, the rotating portion 41 comprises a rotating drum 45. An inner side of the rotating drum 45 is fixedly connected to a partition plate 46, and the water pipe 5 is wound around the rotating drum 45. The rotating drum 45 comprises an opening 451 penetrating an inner side and an outer side of a wall of the rotating drum 45. The first end 51 of the water pipe 5 extends into the rotating drum 45 through the opening 451, and the first end 51 of the water pipe 5 is relatively fixed on the rotating drum 45. The first end 51 of the water pipe 5 is disposed on the partition plate 46. The structure is therefore compact and is easy to be assembled, and is configured to position the first end 51 of the water pipe 5. In a specific embodiment, the water outlet cover 43 is fixedly connected to an upper end of the rotating drum 45, the upper end and a lower end of the rotating drum 45 are further fixedly connected to two baffles 452. The water outlet cover 43 is fixedly connected to an upper baffle 452 of the two baffles 452. The two baffles 452 define a groove wall of the annular accommodating groove 44, that is, the rotating drum 45 and the two baffles 452 cooperate to define the annular accommodating groove 44.

In some embodiments, the water flosser further comprises a fixed portion 12 configured to be fixedly connected to the housing 1, and the rotating portion 41 is relatively rotatably connected to the fixed portion 12. In a specific embodiment, the fixed portion 12 comprises a fixed plate 121 and a fixed shaft 122 fixed on a center of the fixed plate 121. A lower baffle 452 of the two baffles 452 is disposed on an upper side of the fixed plate 121, and the fixed shaft 122 passes through an upper side of the partition plate 46. A blocking ring 13 is further provided to be connected to the fixed shaft 122, and the blocking ring 13 further abuts the upper side of the partition plate 46. The rotating portion 41 is rotatably connected to the fixed portion 12 due to this structure, so that the rotating portion 41 is configured to rotate relative to the housing 1. With this structure, the layout is reasonable, and the structure is compact. Moreover, a receiving space 123 is defined between the partition plate 46 disposed in the rotating drum 45 and the fixed plate 121 of the fixed portion 12.

In this embodiment: the water flosser further comprises an elastic member 7. The elastic member 7 cooperates with the rotating portion 41 and the housing 1 to generate a reset torque when the rotating portion 41 rotates forward. The rotating portion 41 rotates in reverse to achieve a retraction of the water pipe 5 due to the reset torque. In a specific embodiment, the elastic member 7 is a torsion spring. The elastic member 7 is disposed in the receiving space 123 and is connected to the rotating drum 45 of the rotating portion 41 and the fixed shaft 122 of the fixed portion 12 to generate the reset torque when the rotating portion 41 rotates forward. The rotating portion 41 rotates in reverse to achieve the retraction of the water pipe 5 due to the reset torque. First, the elastic member 7 is disposed to achieve an automatic retraction of the water pipe 5, which is convenient for use and provides comfort and convenience. Second, the elastic member 7 is disposed in the receiving space 123, so the layout is reasonable, the structure is compact, and the space occupation is small.

In this embodiment, the water flosser further comprises a rotation stop mechanism 8, and the rotation stop mechanism 8 cooperates with the rotating portion 41 to stop the rotating portion 41 from rotating. The rotating portion 41 comprises a circular portion, the circular portion is disposed with gear teeth 431. The rotation stop mechanism 8 comprises the gear teeth 431 and a control member 14 movably connected to the housing 1. The control member 14 is configured to move between a rotation stop position and a stop release position. The control member 14, when at the rotation stop position, is locked between two adjacent gear teeth 431 to restrict a rotation of the rotating portion 41. The control member 14, when at the stop release position, is separated from the circular portion, so that the rotating portion 41 can rotate freely. In a specific example, the water outlet cover 43 defines the circular portion, and the water outlet cover 43 is configured to position the water connector 42, define the groove wall of the annular accommodating groove 44, and be disposed with the gear teeth 431 to achieve multiple functions. The control member 14 is swingably connected to the housing 1, and the housing 1 is disposed with an operating member 15. The operating member 15 is operatively connected to the control member 14 to drive the control member 14 to swing to control whether the control member 14 is in the rotation stop position or the stop release position. The structure is therefore simple and compact. A second end of the control member 14 is disposed with a rotation stop piece 141. The rotation stop piece 141 of the control member 14, when at the rotation stop position, is locked between the two adjacent gear teeth 431, and the operating member 15 is operatively connected to a first end of the control member 14. The operating member 15, for example, is slidably connected to the housing 1, and the operating member 15 is convenient for use and has high operation stability. Of course, the operating member 15 can also be swingably connected to the housing 1. The rotation stop mechanism 8 further comprises an elastic body 16, such as a spring. The elastic body 16 is connected to the housing 1 and the first end of the control member 14 to enable the control member 14 to be subjected to an elastic force or a torque when the control member 14 is moved from the stop release position to the rotation stop position. When the elastic body 16 is pressed, the control member 14 is at the stop release position, and the elastic member 7 is configured to drive the rotating portion 41 to rotate in reverse to achieve the retraction of the water pipe 5. When the elastic body 16 stops being pressed, the control member 14 is at the rotation stop position and restricts the rotating portion 41 from rotating in reverse. In order to improve convenience, the gear teeth 431 can adapt (i.e., can be) ratchet teeth. When the water pipe 5 is being extended, the rotating portion 41 will not be restricted from rotating forward even when the control member 14 is at the rotation stop position. In other words, a forward rotation of the rotating portion 41 will not be restricted by the control member 14, but the control member 14 at the rotation stop position can restrict a reverse rotation of the rotating portion 41. That is, when the user pulls out (i.e., extends) the water pipe 5, there is no restriction, and the water pipe 5 can be kept in this position after the user releases his/her hand. As needed, the housing 1 is fixed with a connecting base 142, and the control member 14 is rotatably connected to the connecting base 142 through a pivot shaft 143. The connecting base 142 is fixed on the housing 1 by a screw 144.

In this embodiment, the water flosser further comprises a wireless charging portion 9, and the wireless charging portion 9 mutually cooperates with the fixed portion 12. In a specific embodiment, the housing 1 comprises a front housing 17 and a rear housing 18. The front housing 17 faces and is connected to the rear housing 18, and the tooth irrigation portion 2 and the winding mechanism 4 are sandwiched between the front housing 17 and the rear housing 18. A bottom end of the front housing 17 and a bottom end of the rear housing 18 are respectively fixed with a flange 19 facing inward. A fixing connection position 191 is fixed on the flange 19, and the fixed plate 121 is fixedly connected to the fixing connection position 191. Through the aforementioned configuration, the wireless charging portion 9 can charge the water flosser.

When the water pipe 5 is being pulled out, the water pipe 5 is held by a hand of a user (or a pipe opening of the water pipe 5 can be disposed with a small ball head 52, and the small ball head 52 can also be pulled), so that the rotating portion 41 rotates forward (the elastic member 7 retracts to store an elastic force), and the water pipe 5 is pulled out. The gear teeth 431 of an edge of the water outlet cover 43 cooperate with the rotation stop piece 141, and the water outlet cover 43 can only rotate in a forward direction. When the pulling stops, the rotation stop piece 141 clamps the water outlet cover 43 to enable the rotating portion 41 to be stationary and to be unable to rotate in reverse.

When the water pipe 5 is being retracted, the operating member 15 is pressed by the hand of the user. The rotation stop piece 141 is separated from the water outlet cover 43, the rotating portion 41 rotates in reverse due to the elastic force of the elastic member 7, and the water pipe 5 is retracted. That is, the operating member 15 is pressed by the hand of the user, and the water pipe 5 is retracted due to the elastic member 7.

As needed, the front housing 17 is disposed with a control button 171 and an adjustment button 172 configured to switch the tooth irrigation portion 2 between gearing positions and/or turn off/on the water flosser.

Embodiment 2

Referring to FIGS. 14 to 18, this embodiment differs from Embodiment in the following ways.

The rotation stop mechanism 8 comprises a sliding groove 81 extending inward from a top surface of the fixed plate 121 and a movable ball 82. The movable ball 82, for example, is a steel ball, and the movable ball 82 is connected to the sliding groove 81 and is configured to move along the sliding groove 81. The movable ball 82 at least partially extends out of a slot opening of the sliding groove 81. A lower end of the rotating drum 45 is fixed with a track plate 47. The track plate 47 replaces the lower baffle 452 of Embodiment 1 and defines a lower groove wall of the annular accommodation groove 44. A bottom surface of the track plate 47 is concave to define a matching groove 83 configured to cooperate with the movable ball 82. The matching groove 83 comprises an outer annular track 831, an inner annular track 832, and a rotation stop position 833. The rotation stop position 833 is disposed between the outer annular track 831 and the inner annular track 832. A first communication groove 834 is disposed between the rotation stop position 833 and the outer annular track 831, and a second communication groove 835 is disposed between the rotation stop position 833 and the inner annular track 832. A rotation direction from the outer annular track 831 to the rotation stop position 833 is reverse to a rotation direction from the rotation stop position 833 to the inner annular track 832. For example, the rotation direction from the outer annular track 831 to the rotation stop position 833 is reverse (i.e., counterclockwise), and the rotation direction from the rotation stop position 833 to the inner annular track 832 is forward (i.e., clockwise). A third communication groove 836 is disposed between the inner annular track 832 and the outer annular track 831. The following operations can be achieved due to a cooperation of the matching groove 83, the movable ball 82, and the sliding groove 81.

When the water pipe 5 is being pulled out, the water pipe 5 is held by a hand of a user (or a pipe opening of a second end of the water pipe 5 can be disposed with a small ball head 52, and the small ball head 52 can also be pulled) and is pulled outward. The rotating portion 41 drives the movable ball 82 to rotate forward along the outer annular track 831 (the elastic member 7 is retracted, and the elastic force is stored). When the pulling of the water pipe 5 is stopped and the hand is released (the elastic member 7 releases the elastic force), the rotating portion 41 rotates in reverse along the outer annular track 831. The rotating portion 41 drives the movable ball 82 to enter into the rotation stop position 833 along the first communication groove 834. The movable ball 82 is stationary, the movable ball 82 clamps the rotating portion 41 to enable the rotating portion 41 to be stationary, and the water pipe 5 is kept in this position.

When the water pipe 5 is being retracted, the water pipe 5 is pulled slightly by the hand of the user, and the rotating portion 41 rotates to drive the movable ball 82 to enter into the inner annular track 832 along the second communication groove 835. When the hand is released from the water pipe 5, the rotating portion 41 rotates forward along the inner annular track 832 to retract the water pipe 5 due to the elastic force of the elastic member 7.

If it is desired to stop the retraction of the water pipe 5 during the rewinding, the user merely needs to pull the water pipe 5 outward. The rotating portion 41 moves the movable ball 82 to rotate in reverse in the inner annular track 832, and then enters into the outer annular track 831 along the third communication groove 836 to repeat the pulling-out operation. This embodiment adapts an automatic retraction of the water pipe 5. The water pipe 5 is pulled one time, then the hand is released and the water pipe 5 will be retracted and wound to be received in the accommodating space 11. There is no need for the water flosser to be disposed with the operating member 15, the control member 14, etc. of Embodiment 1.

In some embodiments, the sliding groove 81 is radially disposed relative to an axis line of the rotating portion 41 to increase a reliability of the water pipe 5 extending and the water pipe 5 retracting. The inner annular track 832 comprises an inner annular circular groove 8321 around the axis of the rotating portion 41, the third communication groove 836 is linearly disposed along a direction of a tangent line of the inner annular circular groove 8321 to improve reliability of the movable ball 82 entering into the outer annular track 831 along the third communication groove 836. The outer annular track 831 comprises an outer arc groove 8311 disposed about the axis line of the rotating portion 41 and a fourth communication groove 8312 in communication with two ends of the outer arc groove 8311. The first communication groove 834 is in communication with a first end of the outer arc groove 8311, and the third communication groove 836 is in communication with the outer arc groove 8311. A connection between the fourth communication groove 8312 and the first end of the outer arc groove 8311 defines an inflection point, so that the movable ball 82 can enter the rotation stop position 833 along the first communication groove 834 when the water pipe 5 is not pulled. A depth from the first end of the outer arc groove 8311 to a tail end of the fourth communication groove 8312 increases, and a depth from the outer annular track 831 to the third communication groove 836 increases. A depth of the first communication groove 834 is shallower than a depth of the second communication groove 835, and a depth of the second communication groove 835 is shallower than a depth of the inner annular circular groove 8321, so that a control reliability of the water pipe 5 extending and the water pipe 5 retracting is improved.

Embodiment 3

Figure 19:
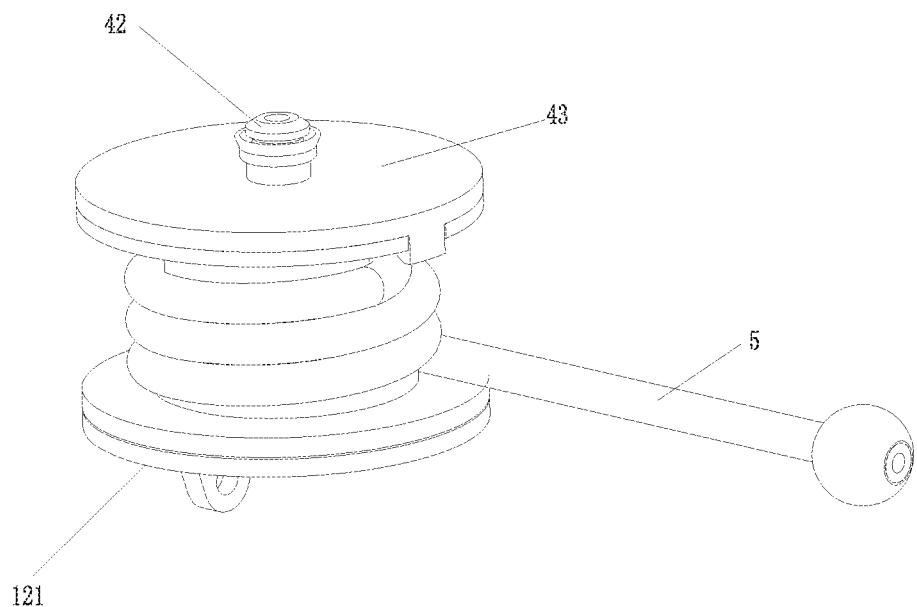
FIG. 19 illustrates a structural view of an assembly of a winding mechanism and a water pipe of Embodiment 3.
Figure 20:
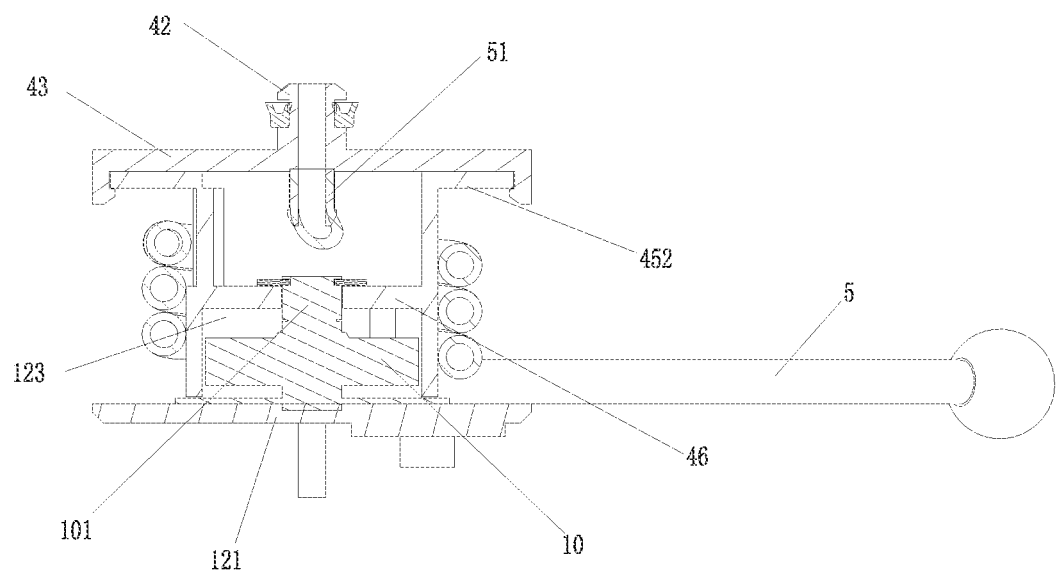
FIG. 20 illustrates a cross-sectional view of the assembly of the winding mechanism and the water pipe of Embodiment 3.
Figure 21:
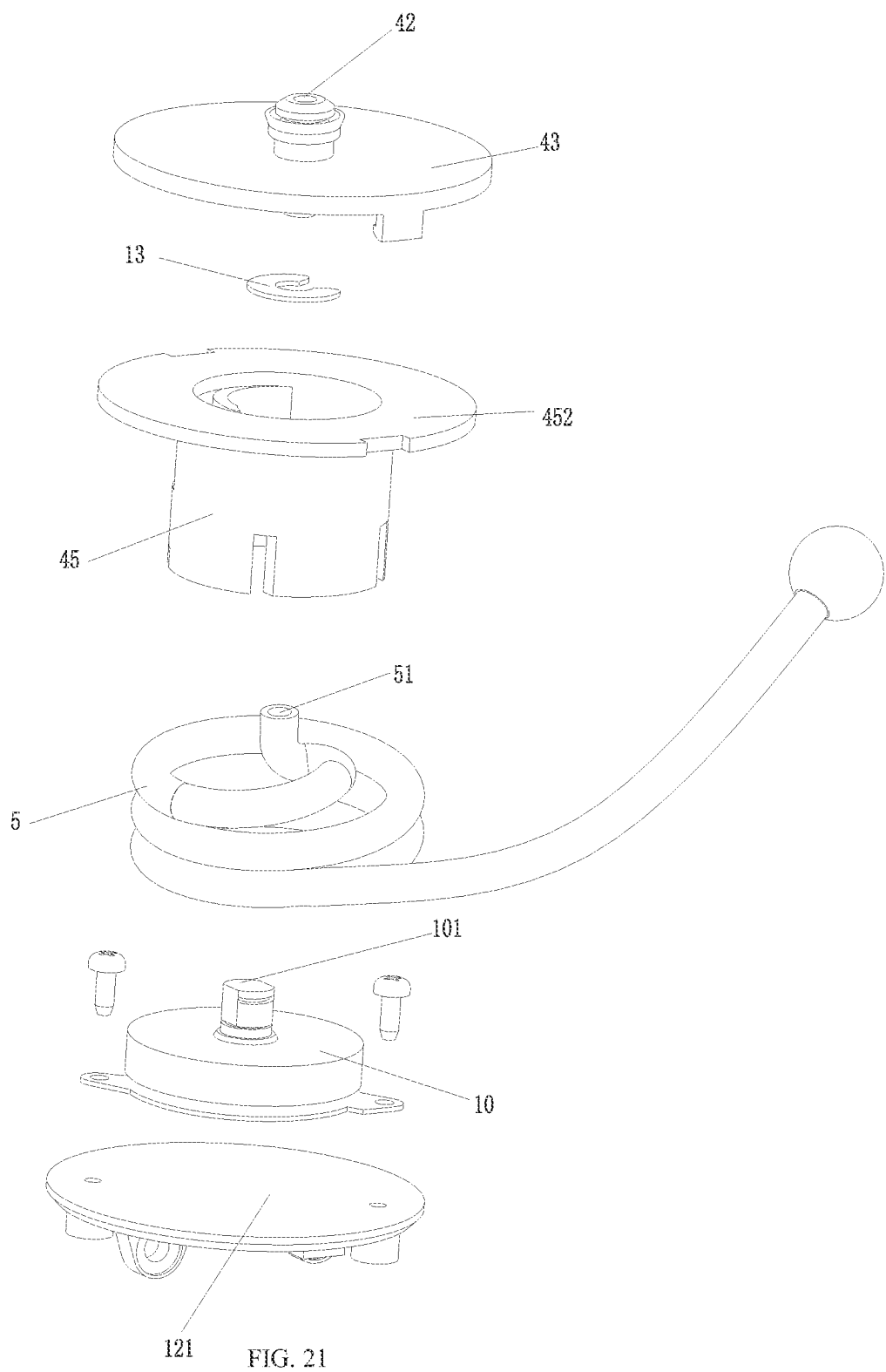
FIG. 21 illustrates an exploded structural view of the winding mechanism and the water pipe of Embodiment 3.

Referring to FIGS. 19-21, this embodiment differs from Embodiment 1 in that the water flosser further comprises a motor 10. The motor 10 is disposed in the accommodating space 11, and a power output shaft 101 of the motor 10 cooperates with the partition plate 46, so that the power output shaft 101 of the motor 10 drives the rotating portion 41 to rotate. For example, the power output shaft 101 is disposed with a non-circular structure, and the partition plate 46 comprises a hole cooperating with the power output shaft 101. The power output shaft 101 and the partition plate 46 define a synchronous rotation connection. The water pipe 5 is able to be retracted due to the motor 10. In a specific embodiment, the water pipe 5 is pulled out by holding the water pipe 5 by a hand of a user to enable the rotating portion 41 to rotate. The water pipe 5 is retracted by pressing a pipe retracting button by the hand of the user, which switches on the motor 10, and the motor 10 will retract the water pipe 5. As needed, a clutch can further be disposed between the power output shaft 101 and the partition plate 46. When the partition plate 46 rotates forward, the motor 10 rotates idly. When the power output shaft 101 rotates in reverse, the power output shaft 101 drives the partition plate 46 to rotate in reverse to achieve retraction of the water pipe 5.

The aforementioned embodiments are merely some embodiments of the present disclosure, and the scope of the disclosure of is not limited thereto. Thus, it is intended that the present disclosure cover any modifications and variations of the presently presented embodiments provided they are made without departing from the appended claims and the specification of the present disclosure.

What is claimed is:

1. A water flosser, comprising:
a housing,
a tooth irrigation portion,
a water nozzle portion,
a winding mechanism, and
a water pipe configured to be bent and wound, wherein:
   the tooth irrigation portion is disposed in the housing and comprises a water inlet and a water outlet,
   the water nozzle portion is in communication with the water outlet of the tooth irrigation portion,
   the winding mechanism comprises a rotating portion configured to rotate relative to the housing,
   the winding mechanism is disposed in the housing,
   an accommodating space configured to receive the water pipe is disposed between the housing and the winding mechanism,
   a first end of the water pipe is relatively fixed on the rotating portion,
   the first end of the water pipe is configured to be in communication with the water inlet of the tooth irrigation portion,
   the water pipe is wound on the rotating portion,
   a second end of the water pipe is configured to extend out of the winding mechanism, and
   the second end of the water pipe is configured to extend out of the housing.

2. The water flosser according to claim 1, comprising:
a water connector, wherein:
   the water connector rotatably cooperates with and is in communication with the water inlet of the tooth irrigation portion, and
   the first end of the water pipe is fixedly connected to and is in communication with the water connector.

3. The water flosser according to claim 2, wherein:
the rotating portion comprises a water outlet cover, and
the water outlet cover is fixedly connected to the water connector.

4. The water flosser according to claim 1, wherein:
an outer revolving surface of the rotating portion is concave to define an annular accommodating groove, and
the water pipe is wound in the annular accommodating groove.

5. The water flosser according to claim 1, comprising:
a fixed portion, wherein:
the rotating portion comprises a rotating drum,
an inner side of the rotating drum is fixedly connected to a partition plate,
the rotating portion is relatively rotatably connected to the fixed portion, and
a receiving space is defined between the partition plate disposed in the rotating drum and the fixed portion.

6. The water flosser according to claim 5, wherein:
the fixed portion comprises a fixed plate and a fixed shaft fixed on the fixed plate,
the fixed shaft passes through an upper side of the partition plate and is further disposed with a blocking ring connected to the fixed shaft, and
the blocking ring abuts the upper side of the partition plate.

7. The water flosser according to claim 1, wherein:
the rotating portion comprises a rotating drum,
the water pipe is wound around the rotating drum,
the rotating drum comprises an opening penetrating an inner side and an outer side of a wall of the rotating drum,
the first end of the water pipe extends into the rotating drum through the opening, and
the first end of the water pipe is relatively fixed on the rotating drum.

8. The water flosser according to claim 1, comprising:
an elastic member, wherein:
   the elastic member cooperates with the rotating portion and the housing to generate a reset torque when the rotating portion rotates forward, and
   the reset torque is configured to drive the rotating portion to rotate in reverse to achieve retraction of the water pipe.

9. The water flosser according to claim 5, comprising:
an elastic member, wherein:
   the elastic member is disposed in the receiving space and is connected to the rotating portion and the fixed portion to generate a reset torque when the rotating portion rotates forward, and
   the reset torque is configured to drive the rotating portion to rotate in reverse to achieve retraction of the water pipe.

10. The water flosser according to claim 8, comprising:
a rotation stop mechanism, wherein:
   the rotation stop mechanism cooperates with the rotating portion to stop the rotating portion from rotating.

11. The water flosser according to claim 9, comprising:
a rotation stop mechanism, wherein:
   the fixed portion comprises a fixed plate,
   the rotation stop mechanism comprises a sliding groove extending inward from a top surface of the fixed plate and a movable ball,
   the movable ball is connected to the sliding groove and is configured to move along the sliding groove,
   the movable ball at least partly extends out of a slot opening of the sliding groove,
   a lower end of the rotating drum is fixed with a track plate,
   a bottom surface of the track plate is concave to define a matching groove configured to cooperate with the movable ball,
   the matching groove comprises an inner annular track, an outer annular track, and a rotation stop position,
   the rotation stop position is disposed between the inner annular track and the outer annular track,
   a first communication groove is disposed between the rotation stop position and the outer annular track, a second communication groove is disposed between the rotation stop position and the inner annular track, and a third communication groove is disposed between the inner annular track and the outer annular track.

12. The water flosser according to claim 11, wherein the sliding groove is radially disposed relative to an axis line of the rotating portion.

13. The water flosser according to claim 11, wherein:
the inner annular track comprises an inner annular circular groove around an axis line of the rotating drum, and
the third communication groove is linearly disposed along a direction of a tangent line of the inner annular circular groove.

14. The water flosser according to claim 13, wherein a rotation direction from the outer annular track to the rotation stop position is reverse to a rotation direction from the rotation stop position to the inner annular track.

15. The water flosser according to claim 14, wherein:
the outer annular track comprises an outer arc groove disposed around an axis line of the rotating drum and a fourth communication groove in communication with two ends of the outer arc groove,
the first communication groove is in communication with a first end of the outer arc groove,
the third communication groove is in communication with the outer arc groove, and
a connection between the fourth communication groove and the first end of the outer arc groove defines an inflection point.

16. The water flosser according to claim 15, wherein:
a depth from the first end of the outer arc groove to a tail end of the fourth communication groove increases,
a depth from the outer annular track to the third communication groove increases,
a depth of the first communication groove is shallower than a depth of the second communication groove, and
the depth of the second communication groove is shallower than a depth of the inner annular circular groove.

17. The water flosser according to claim 10, wherein:
the rotating portion comprises a circular portion,
the circular portion is disposed with gear teeth,
the rotation stop mechanism comprises the gear teeth and a control member movably connected to the housing,
the control member is configured to move between a rotation stop position and a stop release position,
the control member, when at the rotation stop position, is locked between two adjacent gear teeth to restrict a rotation of the rotating portion, and
the control member, when at the stop release position, is separated from the circular portion.

18. The water flosser according to claim 17, wherein:
a second end of the control member is disposed with a rotation stop piece,
the rotation stop piece of the control member, when at the rotation stop position, is locked between the two adjacent gear teeth, and
an operating member is operatively connected to a first end of the control member.

19. The water flosser according to claim 18, wherein:
the rotation stop mechanism further comprises an elastic body, and
the elastic body is connected to the housing and the control member to enable the control member to be subjected to an elastic force or a torque when the control member is moved from the stop release position to the rotation stop position.

20. The water flosser according to claim 1, comprising:
a motor, wherein:
the motor is operatively connected to the rotating portion to drive the rotating portion to rotate forward and reverse.

21. The water flosser according to claim 1, comprising:
a motor, wherein:
the motor is disposed in the accommodating space, and
a power output shaft of the motor cooperates with a partition plate to drive the rotating portion to rotate forward and reverse through the motor.

22. A water flosser, comprising:
a housing,
a tooth irrigation portion,
a water nozzle portion,
a winding mechanism,
a fixed portion,
an elastic member,
a rotation stop mechanism, and
a water pipe configured to be bent and wound, wherein:
the tooth irrigation portion is disposed in the housing and comprises a water inlet and a water outlet,
the water nozzle portion is in communication with the water outlet of the tooth irrigation portion,
the winding mechanism is connected to the housing and comprises a rotating portion configured to rotate relative to the housing,
a first end of the water pipe is relatively fixed on the rotating portion,
the first end of the water pipe is configured to be in communication with the water inlet of the tooth irrigation portion,
the water pipe is wound on the rotating portion,
a second end of the water pipe is configured to extend out of the winding mechanism,
the rotating portion comprises a rotating drum,
an inner side of the rotating drum is fixedly connected to a partition plate,
the rotating portion is relatively rotatably connected to the fixed portion,
a receiving space is defined between the partition plate disposed in the rotating drum and the fixed portion,
the elastic member is disposed in the receiving space and is connected to the rotating portion and the fixed portion to generate a reset torque when the rotating portion rotates forward,
the reset torque is configured to drive the rotating portion to rotate in reverse to achieve retraction of the water pipe,
the fixed portion comprises a fixed plate,
the rotation stop mechanism comprises a sliding groove extending inward from a top surface of the fixed plate and a movable ball,
the movable ball is connected to the sliding groove and is configured to move along the sliding groove,
the movable ball at least partly extends out of a slot opening of the sliding groove,
a lower end of the rotating drum is fixed with a track plate,
a bottom surface of the track plate is concave to define a matching groove configured to cooperate with the movable ball,
the matching groove comprises an inner annular track, an outer annular track, and a rotation stop position,
the rotation stop position is disposed between the inner annular track and the outer annular track, a first communication groove is disposed between the rotation stop position and the outer annular track, a second communication groove is disposed between the rotation stop position and the inner annular track, and a third communication groove is disposed between the inner annular track and the outer annular track.

23. A water flosser, comprising:

a housing, a tooth irrigation portion, a water nozzle portion, a winding mechanism, an elastic member, a rotation stop mechanism, and a water pipe configured to be bent and wound, wherein:

the tooth irrigation portion is disposed in the housing and comprises a water inlet and a water outlet, the water nozzle portion is in communication with the water outlet of the tooth irrigation portion, the winding mechanism is connected to the housing and comprises a rotating portion configured to rotate relative to the housing, a first end of the water pipe is relatively fixed on the rotating portion, the first end of the water pipe is configured to be in communication with the water inlet of the tooth irrigation portion, the water pipe is wound on the rotating portion, a second end of the water pipe is configured to extend out of the winding mechanism, the elastic member cooperates with the rotating portion and the housing to generate a reset torque when the rotating portion rotates forward, the reset torque is configured to drive the rotating portion to rotate in reverse to achieve retraction of the water pipe, the rotation stop mechanism cooperates with the rotating portion to stop the rotating portion from rotating, the rotating portion comprises a circular portion, the circular portion is disposed with gear teeth, the rotation stop mechanism comprises the gear teeth and a control member movably connected to the housing, the control member is configured to move between a rotation stop position and a stop release position, the control member, when at the rotation stop position, is locked between two adjacent gear teeth to restrict a rotation of the rotating portion, and the control member, when at the stop release position, is separated from the circular portion.

* * * * *